O. GAMPER.
MACHINE FOR FACILITATING THE PACKING OF MAGNETIC OBJECTS OF OBLONG SHAPE.
APPLICATION FILED JAN. 16, 1914.
Reissued May 19, 1914. 13,731.
2 SHEETS—SHEET 1.
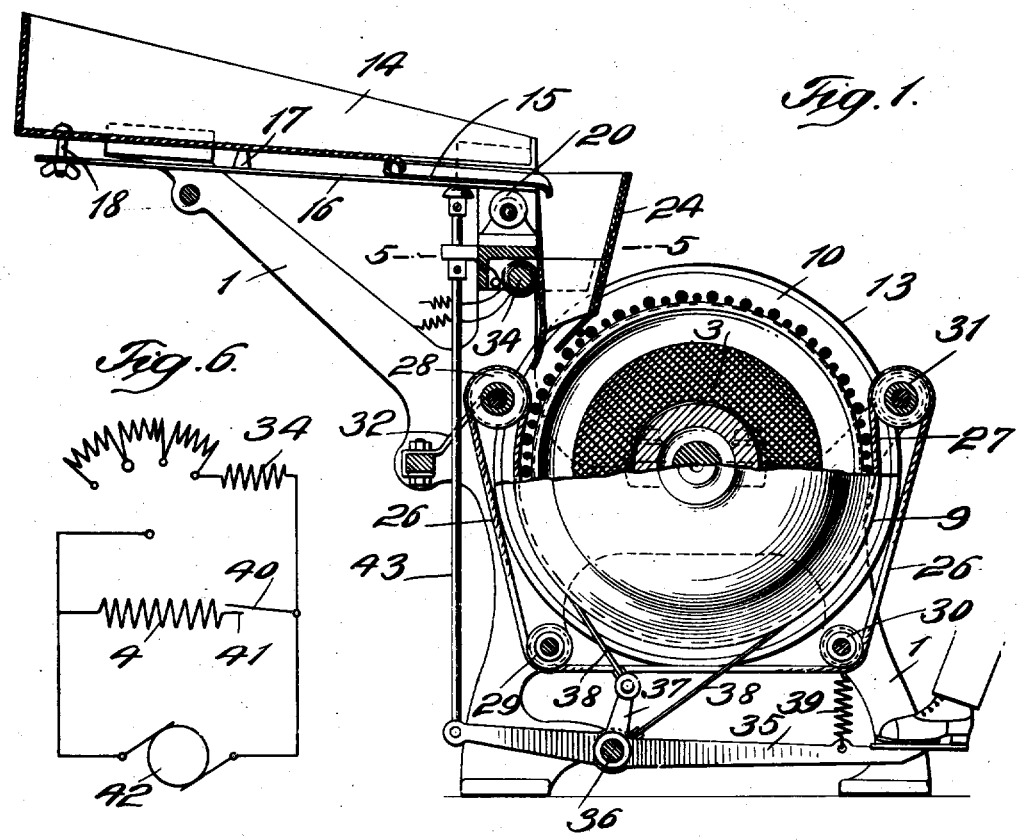
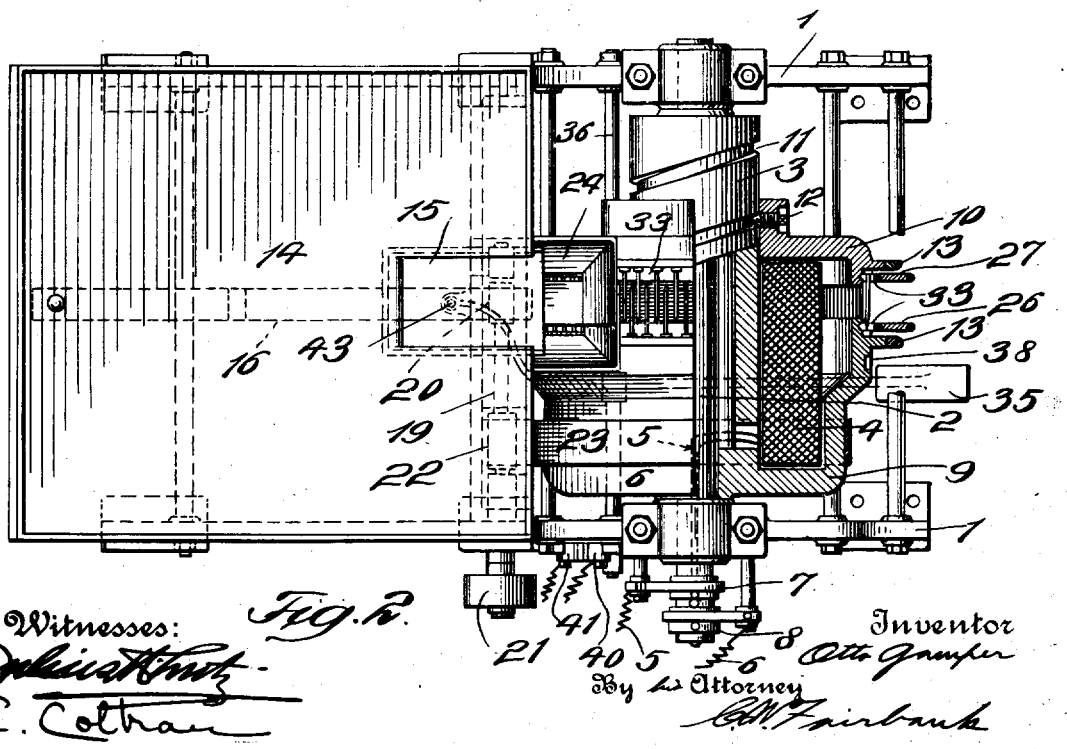
Fig. 2.
Witnesses:
J. Wm. Knox
E. Coltrane
Inventor
Otto Gamper
By his Attorney
Chas. Fairbanks O. GAMPER.
MACHINE FOR FACILITATING THE PACKING OF MAGNETIC OBJECTS OF OBLONG SHAPE.
APPLICATION FILED JAN. 16, 1914.
Reissued May 19, 1914.
13,731.
2 SHEETS—SHEET 2.
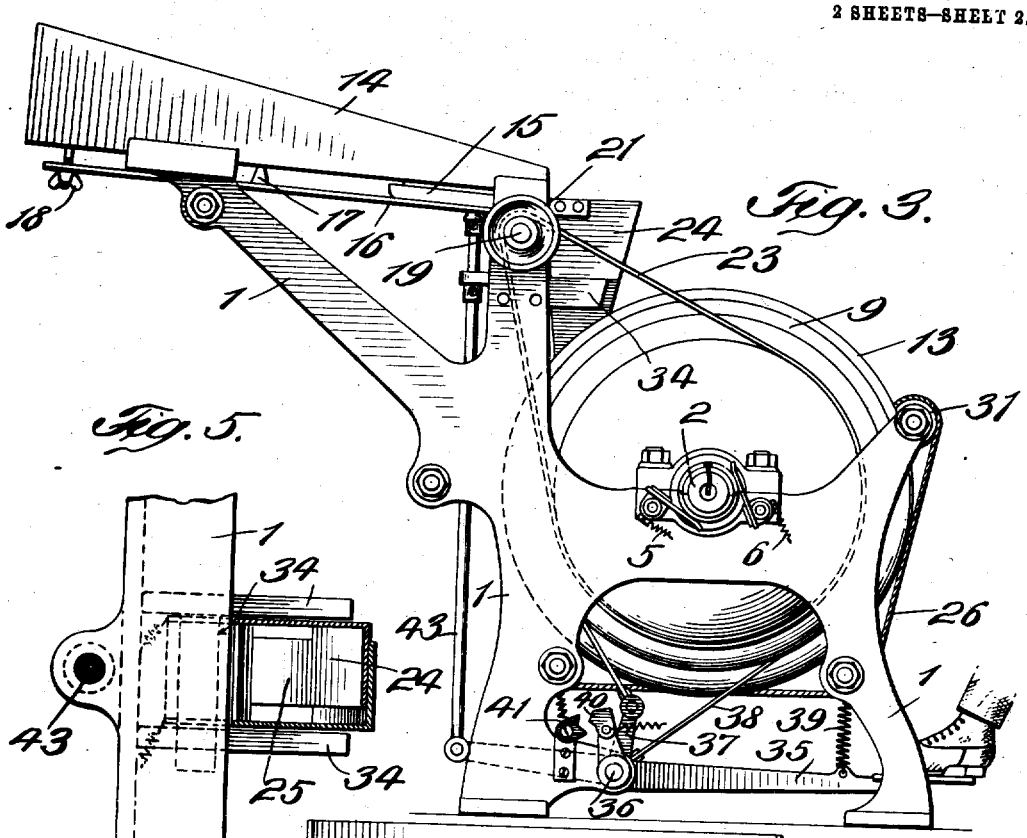
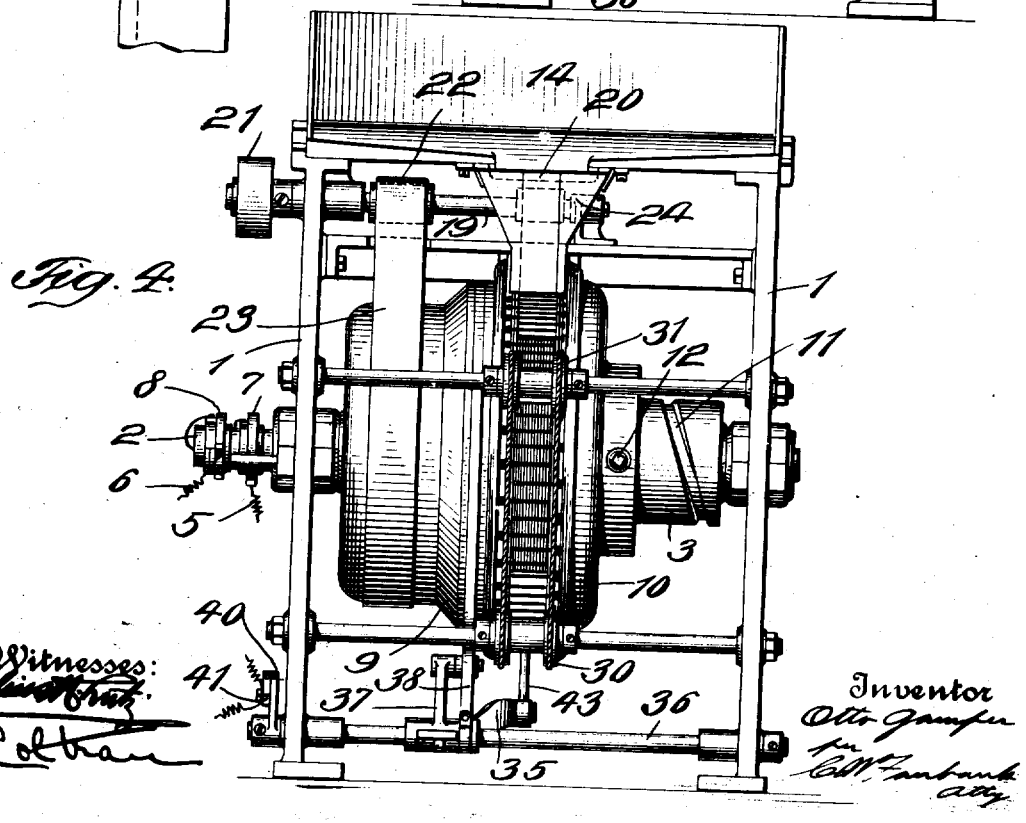
Witnesses:
Julius Frank
E. Cobham
Inventor
Otto Gamper
by
Chas. Fairbank
Atty

UNITED STATES PATENT OFFICE.

OTTO GAMPER, OF MÜNCHWILEN, SWITZERLAND.

MACHINE FOR FACILITATING THE PACKING OF MAGNETIC OBJECTS OF OBLONG SHAPE.

REISSUED 13,731. Specification of Reissued Letters Patent. Reissued May 19, 1914.

Original No. 1,014,869, dated January 16, 1912, Serial No. 604,870. Application for reissue filed January 16, 1914. Serial No. 812,609.

*To all whom it may concern:*

Be it known that I, OTTO GAMPER, a citizen of the Republic of Switzerland, residing at Münchwilen, Switzerland, have invented new and useful Improvements in Machines for Facilitating the Packing of Magnetic Objects of Oblong Shape; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a machine for facilitating the packing of magnetic objects of oblong shape, such as nails, screws, etc. To enable objects of this kind to be packed into a receptacle such as a paper bag it is necessary that they should all be parallel with each other, because, when they stick out in various directions, they are difficult to put into the bag. It may also occur that they pierce the bag, and fall out. It is very difficult and tedious to place the objects into the desired position by hand.

The object of this invention is to overcome these drawbacks by placing the objects between parallel poles of a magnet so that the action of the lines of force tends to place them at right angles to the parallel poles.

One important feature of my invention involves the forming of an elongated groove between two magnetic poles the width of the groove corresponding to the lengths of the magnetic objects, and the groove being open along its length so that objects may be distributed along the length of the groove, and lie transversely thereof.

Various other important features are involved which will be particularly pointed out in the claims.

In the drawings an example of the machine forming the subject matter of this invention is shown.

Figure 1 is a sectional elevation of the machine; Fig. 2 is a plan view of the same partly in section; Fig. 3 is a side elevation; and Fig. 4 is a front end view of the machine; Fig. 5 is a section on line 5—5 of Fig. 1, on an enlarged scale; Fig. 6 is a diagrammatic view of the circuit for the magnet exciting current.

1 designates the frame of the machine in which is carried the shaft 2 of a hollow sleeve 3. On this sleeve is fixed a coil 4 to which current is supplied through wires 5, 6 over contacts 7, 8. One end of the sleeve is shaped into an annular north magnetic pole piece 9 while the other and south magnetic pole piece 10 is adjustably carried on sleeve 3. In order to facilitate the adjusting of this pole, the sleeve 3 is threaded as at 11 and a screw 12 carried by the pole piece 10 is adapted to engage the thread. This is for the purpose of adapting the distance between the poles to the size of the nails. The north and south magnetic poles 9 and 10 respectively form between them a circular groove with said north and south magnetic poles on opposite sides and which serves to receive the nails. The outer edges of the pole rings 9 and 10 are covered with rings 13, 13 of non-magnetic material. The nails are in an open feeding receptacle or box 14 which is fixed on the frame 1 and has a movable part 15 which is adapted to be engaged by a spring 16. The spring turns on a fulcrum 17 and its position is adjusted by a screw 18. On the driving shaft 19 is fixed a cam 20 which on rotation of shaft 19 imparts a rocking motion to the movable part 15. The movement of this part 15 serves to jar the objects to the free edge so that they may fall off and thus the part 15 serves as a delivery part or as a chute. The shaft 19 carries a pulley 21 through which it is rotated and a pulley 22 transmitting its rotation to sleeve 3 through a belt 23 passing over the extended end of said sleeve. The nails on falling from the movable part 15 are received by a hopper 24 which by means of plate 25 guides them into the annular groove between poles 9 and 10 where the action of the lines of force brings them parallel to said lines of force and at right angles to the faces of said poles between the latter, as illustrated at the left of Fig. 2 and in Fig. 4. In order to bring the nails closer together and to the bottom of the groove and thus leave space for more nails two endless cords 26, 27 are provided which pass over rollers 28, 29, 30 and 31 and through the grooves between the poles. When no nails are present the cords are guided by two grooves 33 of the poles 9, 10 (see Fig. 2). Tension is put on the cords by means of a spring 32 carrying the roller 28 so that the cords may move outward radially within the groove as nails accumulate between the innermost portion of the groove and the cords. A horse shoe magnet 34 is arranged near the top of frame 1 and so that its arms embrace the hopper 24 so as to obtain a preliminary adjustment of the nails as they pass between the arms of the magnet. The hopper is made in two parts as best shown in Fig. 5 so as to enable it to be adapted to the distance of the poles 9, 10.

The machine is controlled by means of a foot lever 35 mounted on the fulcrum 36 to which is fixed a lever 37. One end of a brake belt 38 acting on the rotary magnet is attached to this lever while the other one is fixed to fulcrum 36. When the lever 35 is depressed against the action of a spring 39 the brake is locked and the rotary magnet is stopped while shaft 19 continues to rotate, the belt 23 sliding on its pulleys. At the same time the depressing of the lever 35 breaks the circuit from the source of electric energy 42 (Fig. 6) to coil 4 at the contacts 40, 41 and, through a pushing rod 43 lifts the movable part 15 so that the cam 20 can no longer rock the movable part 15 and no more nails fall into hopper 24.

When a sufficient amount of nails have been distributed about the periphery of the magnet, and in parallel positions within the groove the foot lever is depressed to stop the feeding, break the circuit and apply the brake band. The small amount of residual magnetism remaining in the poles after the breaking of the electric circuit is sufficient to retain the nails in parallelism in the groove, and prevent them from slipping along the groove to the lower portion of the latter. The brake band tension is so controlled that the belt 23 will slip and the magnet be permitted to rotate very slowly while the operator gathers up the nails in groups or by the handful from the upper side of the groove and transfers them to a box or packing receptacle. The residual magnetism in the poles will cause the nails which are below the magnet at the time the circuit is broken to move along up to the upper side as the magnet is slowly rotated, but it will not be sufficient to materially interfere with the manual removal of the nails from the magnets.

It is to be understood that this invention is not limited to a machine having a rotary magnet as described. The magnet poles might also be straight and move in a straight line instead of being circular and turning on a shaft, without departing from the spirit of this invention.

In the particular machine illustrated, the movement of the groove endwise past the feeding receptacle during the delivery of the objects from the latter to the former, distributes said objects along the groove, although, I do not wish to be limited to the specific means shown for accomplishing this result, as other means within the scope of the amended claims may be employed.

Having now particularly described and ascertained the nature of the said invention and in what manner the same is to be performed, I declare that what I claim is:

1. In a machine for facilitating the packing of magnetic objects of oblong shape, north and south magnetic poles spaced apart to form a groove therebetween, said groove being open along one side, and means for delivering objects to said groove along the length thereof, and through said open side.

2. In a machine for facilitating the packing of magnetic objects of oblong shape, two magnetic poles having a groove formed between them the width of said groove being substantially equal to the length of said objects, and the north and south magnetic poles being on opposite sides of said groove, and said groove being open along one side.

3. In a machine for facilitating the packing of magnetic objects of oblong shape, two magnetic poles having a groove formed between them the width of said groove being substantially equal to the length of said object, the north and south magnetic poles being on opposite sides of said groove, and said groove being open along one side, and means for delivering magnetic objects to said groove through said open side.

4. In a machine for facilitating the packing of magnetic objects of oblong shape, two magnetic poles having a groove formed between them, the north and south magnetic poles being on opposite sides of said groove, and the width of said groove being substantially equal to the length of said objects, and a feeding receptacle for said objects having a movable part delivering said objects to the open side of said groove.

5. In a machine for facilitating the packing of magnetic objects of oblong shape, two magnetic poles having a groove formed between them, the north and south magnetic poles being on opposite sides of said groove, and the width of said groove being substantially equal to the length of said objects, and a feeding receptacle for said objects having a movable part delivering said objects to the open side of said groove and along substantially the entire length thereof.

6. In a machine for facilitating the packing of magnetic objects of oblong shape, two magnetic poles having a groove formed between them, the north and south magnetic poles being on opposite sides of said groove, and said groove being open throughout its length along one side, and a feeding receptacle delivering through said open side, said receptacle and said groove being relatively movable.

7. In a machine for facilitating the packing of magnetic objects of oblong shape, two magnetic poles having a groove formed between them, the north and south magnetic poles being on opposite sides of said groove, and said groove being open throughout its length along one side, a feeding receptacle delivering through said open side, and means for effecting a relative movement of said receptacle and said groove in the direction of the length of the groove.

8. In a machine for facilitating the packing of magnetic objects of oblong shape, two magnetic poles having a groove formed between them, the north and south magnetic poles being on opposite sides of said groove, a feeding receptacle for the objects having a movable part, a rotatable cam normally engaging said part, and means for disengaging said part from the cam.

9. In a machine for facilitating the packing of magnetic objects of oblong shape, two magnetic poles having a groove formed between them, the north and south magnetic poles being on opposite sides of said groove, a feeding receptacle for the objects having a movable part, a cam engaging said part, a lever, means operated by the lever to break the circuit of the magnetic poles, and means also operated by said lever to disengage said movable part from the cam.

10. In a machine for facilitating the packing of magnetic objects of oblong shape, two magnetic poles having a groove formed between them, the north and south magnetic poles being on opposite sides of said groove, a feeding receptacle for the objects having a movable delivering part, means for agitating said part and means for simultaneously stopping said agitation and breaking the circuit of said magnetic poles.

11. In a machine for facilitating the packing of magnetic objects of oblong shape, north and south magnetic poles spaced apart to form a groove therebetween, said groove being open along one side throughout its length, means for delivering magnetic objects to said groove through said open side, and means for varying the width of said groove.

12. In a machine for facilitating the packing of magnetic objects of oblong shape, north and south magnetic poles spaced apart to form a groove between them of a width substantially equal to the length of said objects and means for adjusting one magnetic pole toward and from the other to vary the width of the groove.

13. In a machine for facilitating the packing of magnetic objects of oblong shape, two magnetic poles, a groove formed between them, the north and south magnetic poles being on opposite sides of said groove, a feeding receptacle for the objects having a movable part, a driving shaft, a cam on the latter engaging said part, a lever, and means operated by the lever to break the circuit of the magnetic poles, and a bar carried by the lever adapted to effect disengagement of the part and the cam.

14. In a machine for facilitating the packing of magnetic objects of oblong shape, a cylindrical rotary magnet having two magnetic poles forming a groove circumferentially of said magnet, the north and south magnetic poles being on opposite sides of the groove and means for delivering the magnetic objects to said groove.

15. In a machine for facilitating the packing of magnetic objects of oblong shape, a cylindrical rotary magnet having two magnetic poles forming a groove circumferentially of said magnet, the north and south magnetic poles being on opposite sides of the groove, and means for delivering the magnetic objects to said groove through the open side of the latter.

16. In a machine for facilitating the packing of magnetic objects of oblong shape, a magnet having two magnetic poles forming a groove, the north and south magnetic poles being on opposite sides of the groove, and the groove being open along the length of the latter, a feeding receptacle, and means for moving the groove in the direction of its length and in respect to said receptacle.

17. In a machine for facilitating the packing of magnetic objects of oblong shape, a cylindrical rotary magnet having two magnetic poles forming a groove, the north and south magnetic poles being on opposite sides of the groove, said groove being formed circumferentially on said magnet, rollers journaled in the machine frame, and a pair of cords passing over said rollers and over part of the periphery of one of the magnetic poles.

18. In a machine for facilitating the packing of magnetic objects of oblong shape, a rotary magnet, two magnetic poles spaced to leave a groove therebetween, the north and south magnetic poles being on opposite sides of the groove and said groove being formed circumferentially on said magnet, and flexible means following the periphery of a portion of said magnet for retaining objects in engagement therewith upon the deënergizing of the magnet.

19. In a machine for facilitating the packing of magnetic objects of oblong shape, a rotary magnet having two magnetic poles forming a circular groove between them, the north and south magnetic poles being on opposite sides of the groove, said groove being formed circumferentially on said rotary magnet, a feeding receptacle and means for simultaneously arresting the rotation of the magnet and stopping the feeding action.

20. In a machine for facilitating the packing of magnetic objects of oblong shape, a rotary magnet having two magnetic poles forming a circular groove between them, the north and south magnetic poles being on opposite sides of the groove, a movable feeding device and means for simultaneously arresting the rotation of the magnet and stopping said feeding device.

21. In a machine for facilitating the packing of magnetic objects of oblong shape, a bodily movable magnet having north and south magnetic poles, spaced apart and forming a groove between them, a movable delivery part and means for stopping the movement of said magnet and the movement of said part simultaneously.

22. In a machine for facilitating the packing of magnetic objects of oblong shape, a bodily movable magnet having two magnetic poles, forming a groove between them, the north and south magnetic poles being on opposite sides of the groove, and means for stopping said magnet and simultaneously deënergizing it.

23. In a machine for facilitating the packing of magnetic objects of oblong shape, a rotary magnet having two magnetic poles forming a circular groove, the north and south magnetic poles being on opposite sides of the groove, means for arresting the rotation of the magnet, and means for automatically breaking the circuit of the magnet at the same time.

24. In a machine for facilitating the packing of magnetic objects of oblong shape, a rotary magnet having two magnetic poles forming a circular groove, the north and south magnetic poles being on opposite sides of the groove, a lever fulcrumed on the machine frame, a belt brake adapted to be operated by said lever and to act on the rotary magnet to arrest its rotation, and a contact in the circuit of the rotary magnet adapted to be broken when the lever is actuated.

25. In a machine for facilitating the packing of magnetic objects of oblong shape, a rotary magnet having two magnetic poles forming a circular groove, the north and south magnetic poles being on opposite sides of the groove, a feeding receptacle for the objects having a movable delivery part, and means for automatically rocking said part.

26. In a machine for facilitating the packing of magnetic objects of oblong shape, a bodily movable magnet having two magnetic poles normally rigid in respect to each other and spaced to leave a groove, the north and south magnetic poles being on opposite sides of the grooves, a feeding receptacle for the objects having a movable dispensing part, and means for automatically rocking said part.

27. In a machine for facilitating the packing of magnetic objects of oblong shape, a magnet having two magnetic poles normally rigid in respect to each other and spaced to leave a groove, the north and south magnetic poles being on opposite sides of the grooves, a feeding receptacle for the objects having a movable dispensing part, and means for automatically rocking said part.

28. In a machine for facilitating the packing of magnetic objects of oblong shape, a rotary magnet having two magnetic poles forming a circular groove, the north and south magnetic poles being on opposite sides of the groove, a feeding receptacle for the objects having a movable delivery part, means for automatically rocking said part, and means for automatically stopping the feeding upon stopping the magnet.

29. In a machine for facilitating the packing of magnetic objects of oblong shape, a rotary magnet having two magnetic poles forming a circular groove, the north and south magnetic poles being on opposite sides of the groove, a feeding receptacle for the objects having a movable delivery part, means for automatically rocking said part, and means for automatically stopping the rotation of the magnet and deënergizing the magnet.

30. In a machine for facilitating the packing of magnetic objects of oblong shape, a rotary magnet having two magnetic poles forming a circular groove, the north and south magnetic poles being on opposite sides of the groove, a feeding receptacle for the objects having a movable delivery part, means for automatically rocking said part, and means for automatically stopping the feeding action upon stopping the rotation of the magnet.

31. In a machine for facilitating the packing of magnetic objects of oblong shape, a rotary magnet having two magnetic poles forming a circular groove, the north and south magnetic poles being on opposite sides of the groove, a feeding receptacle for the objects having a movable delivery part, a driving shaft, a cam on the latter engaging said part, a belt brake, a lever fulcrumed on the machine frame adapted to lock the belt brake, a circuit breaker for the rotary magnet operable by the lever, and means carried by the lever to disengage said movable part from said cam.

32. In a machine for facilitating the packing of magnetic objects of oblong shape, a rotary magnet having two magnetic poles forming a circular groove, the north and south magnetic poles being on opposite sides of the groove, means for delivering the magnetic objects to said groove and means for varying the width of said groove.

33. In a machine for facilitating the packing of magnetic objects of oblong shape, a rotary magnet having two magnetic poles forming a circular groove, the north and south magnetic poles being on opposite sides of the groove, means for delivering magnetic objects to said groove through the open side thereof.

34. In a machine for facilitating the packing of magnetic objects of oblong shape, a rotary magnet having two magnetic poles forming a circular groove, the north and south magnetic poles being on opposite sides of the groove, and the width of said groove being substantially equal to the length of said objects, and means for varying the width of said groove.

35. In a machine for facilitating the packing of magnetic objects of oblong shape, a cylindrical rotary magnet having two magnetic poles forming a groove, the north and south magnetic poles being on opposite sides of the groove, said groove being formed circumferentially on the rotary magnet, means for displacing one of the poles with relation to the other to vary the width of the groove, a driving shaft, a feeding receptacle for the objects having a movable chute, a cam on the shaft engaging said chute, a lever fulcrumed on the machine frame, a brake operated by the lever to arrest rotation of said magnet, a circuit breaker for the rotary magnet, a push bar carried by said lever adapted to disengage said movable chute from said cam.

36. In a machine for facilitating the packing of magnetic objects of oblong shape, a cylindrical rotary magnet having two magnetic poles forming a groove, the north and south magnetic poles being on opposite sides of the groove, said groove being formed circumferentially of the rotary magnet, means for displacing one of the poles with relation to the other, to vary the width of the groove, a feeding receptacle for the objects having a movable chute, a driving shaft, a cam on the latter engaging said chute, a lever fulcrumed on the machine frame, a belt brake adapted to be locked by said lever and to act on the rotary magnet to arrest rotation thereof, and a contact in the circuit of the rotary magnet adapted to be broken when the lever is actuated, and means carried by said lever adapted to disengage said movable chute from said cam.

37. In a machine for facilitating the packing of magnetic objects of oblong shape, parallel north and south magnetic poles, spaced apart to form a groove between them of a width substantially equal to the length of said objects, and means for inserting the magnetic objects into said groove.

38. In a machine for facilitating the packing of magnetic objects of oblong shape, a rotary magnet having two parallel magnetic poles forming a circular groove, the north and south magnetic poles being on opposite sides of the groove, means for arresting the rotation of the magnet, a feeding receptacle for the objects having a movable delivery part, a lever fulcrumed on the machine frame, a contact in the circuit of the rotary magnet, and connections for operating said arresting means, breaking said contact, and stopping action of said delivery part upon operating said lever.

39. In a machine for facilitating the packing of magnetic objects of oblong shape, a bodily movable magnet having two parallel magnetic poles forming a groove, the north and south magnetic poles being on opposite sides of the groove, a feeding receptacle for the objects having a movable delivery part, a lever fulcrumed on the machine frame, a contact in the circuit of the magnet, means for arresting the movement of the magnet, and connections for operating said arresting means, breaking said contact, and stopping the action of said delivery part upon operating said lever.

40. In a machine for facilitating the packing of magnetic objects of oblong shape, two parallel magnetic poles, forming a groove, the north and south magnetic poles being on opposite sides of the groove and spaced apart to a distance substantially equal to the length of said objects, a feeding receptacle, said receptacle and said magnet being relatively movable in the direction of the length of the groove, and means for arresting said movement, means for deënergizing said magnet, and manually operable means for simultaneously controlling said arresting means and said deënergizing means.

41. In a machine for facilitating the packing of magnetic objects of oblong shape, having two magnetic poles spaced apart to leave a groove therebetween of a width substantially equal to the length of said objects, a hopper for delivering to said groove, means for varying the width of said groove, and means for varying the width of said hopper in accordance with the width of the groove.

42. In a machine for facilitating the packing of magnetic objects of oblong shape, two magnetic poles spaced apart to form a groove therebetween, the width of said groove being substantially equal to the length of said objects, a hopper delivering to said groove, and magnetic poles upon opposite sides of said hopper tending to straighten said objects to parallel positions before they are delivered to said groove.

OTTO GAMPER.

Witnesses:
E. C. LAUPT,
A. J. DURINPFE.